(12) United States Patent
Schubert

(10) Patent No.: US 11,281,461 B2
(45) Date of Patent: Mar. 22, 2022

(54) EXTENSIBLE PERSISTENCE HIERARCHIES FOR WORKFLOW MANAGEMENT SYSTEMS

(71) Applicant: SAP SE, Walldorf (DE)

(72) Inventor: Harald Schubert, Ratzeburg (DE)

(73) Assignee: SAP SE, Walldorf (DE)

( * ) Notice: Subject to any disclaimer, the term of this patent is extended or adjusted under 35 U.S.C. 154(b) by 30 days.

(21) Appl. No.: 16/891,513

(22) Filed: Jun. 3, 2020

(65) Prior Publication Data
US 2021/0382714 A1    Dec. 9, 2021

(51) Int. Cl.
*G06F 9/44* (2018.01)
*G06F 8/77* (2018.01)
*G06F 40/40* (2020.01)
*G06Q 10/10* (2012.01)
*G06F 9/54* (2006.01)

(52) U.S. Cl.
CPC .......... *G06F 8/77* (2013.01); *G06F 9/54* (2013.01); *G06F 40/40* (2020.01); *G06Q 10/103* (2013.01)

(58) Field of Classification Search
CPC .. G06F 8/77; G06F 9/54; G06F 40/40; G06Q 10/103
USPC .................................................. 717/101–123
See application file for complete search history.

(56) References Cited

U.S. PATENT DOCUMENTS

| | | | |
|---|---|---|---|
| 6,442,748 B1 * | 8/2002 | Bowman-Amuah | G06F 8/20 717/108 |
| 6,601,234 B1 * | 7/2003 | Bowman-Amuah | G06Q 10/06375 717/108 |
| 7,664,419 B2 * | 2/2010 | Matoba | G03G 15/50 399/80 |
| 9,569,596 B2 * | 2/2017 | Marcus | G06Q 10/107 |
| 11,080,031 B2 * | 8/2021 | Bequet | G06N 3/063 |

OTHER PUBLICATIONS

Eder et al., "Synchronizing Copies of External Data in Workflow Management Systems", 2005, Springer-Verlag, pp. 248-261. (Year: 2005).*
Carvalho, "Making Long-Lived Transactions Easier to Develop", 2013, Master Thesis at Tecnico Lisboa, Portugal, 66 pages. (Year: 2013).*

* cited by examiner

*Primary Examiner* — Ted T. Vo
(74) *Attorney, Agent, or Firm* — Buckley, Maschoff & Talwalkar LLC

(57) ABSTRACT

Methods and systems may be associated with a workflow management environment. An external data store may be associated with a persistence technology to contain operational data. A workflow management platform may include a running workflow and a workflow context associated with a persistence technology to contain application state information. A data access language component may be coupled between the running workflow and the external data store to access the operational data in a declarative way. The data access language component may, for example, copy the operational data transparently for a developer of the running workflow. The data access language component may then store the operational data transiently in a short-lived session and, after the operational data is processed by the running flow, release the operational data. According to some embodiments, changes made to the to the operational data are automatically played back to the external data store.

20 Claims, 12 Drawing Sheets

EXTENSIBLE PERSISTENCE HIERARCHIES FOR WORKFLOW MANAGEMENT SYSTEMS

BACKGROUND

A workflow management system may be used to run complex business applications. Often, all of an applications state and business data are stored within a workflow's context structure (e.g., the container for data attached to each workflow instance). For example, such an approach may be based on a generic persistence embodied into a workflow management system. Such a workflow context structure is generic (and thus can store any type of data) but is not optimized to hold any particular type of information. In some cases, workflow context information may be subject to versioning and/or snapshot requirements as the execution of the workflow progresses. As a result, data stored in the workflow context may be relatively expensive. It can be difficult, however, for a developer to accurately determine which data should be stored in the workflow context and which data can be stored in external data stores.

It would therefore be desirable to let a workflow management system access external operational data in an automatic and efficient manner.

SUMMARY

According to some embodiments, methods and systems may be associated with a workflow management environment. An external data store may be associated with a persistence technology to contain operational data. A workflow management platform may include a running workflow and a workflow context associated with a persistence technology to contain application state information (e.g., control data, snapshots, audit logs, etc.). A data access language component may be coupled between the running workflow and the external data store to access the operational data in a declarative way. The data access language component may, for example, copy the operational data transparently for a developer of the running workflow. The data access language component may then store the operational data transiently in a short-lived session and, after the operational data is processed by the running flow, release the operational data. According to some embodiments, changes made to the to the operational data are automatically played back to the external data store.

Some embodiments comprise: means for executing, by a workflow management system, a running workflow with a workflow context associated with a persistence technology to contain application state information; means for copying operational data, in a declarative way by a data access language component coupled between the running workflow and an external data store associated with a persistence technology to contain the operational data, transparently for a developer of the running workflow; means for storing the operational data transiently in a short-lived session; and, after the operational data is processed by the running flow, means for releasing the operational data.

Some technical advantages of some embodiments disclosed herein are improved systems and methods to let a workflow management system access external operational data in an automatic and efficient manner.

DETAILED DESCRIPTION

Figure 1:
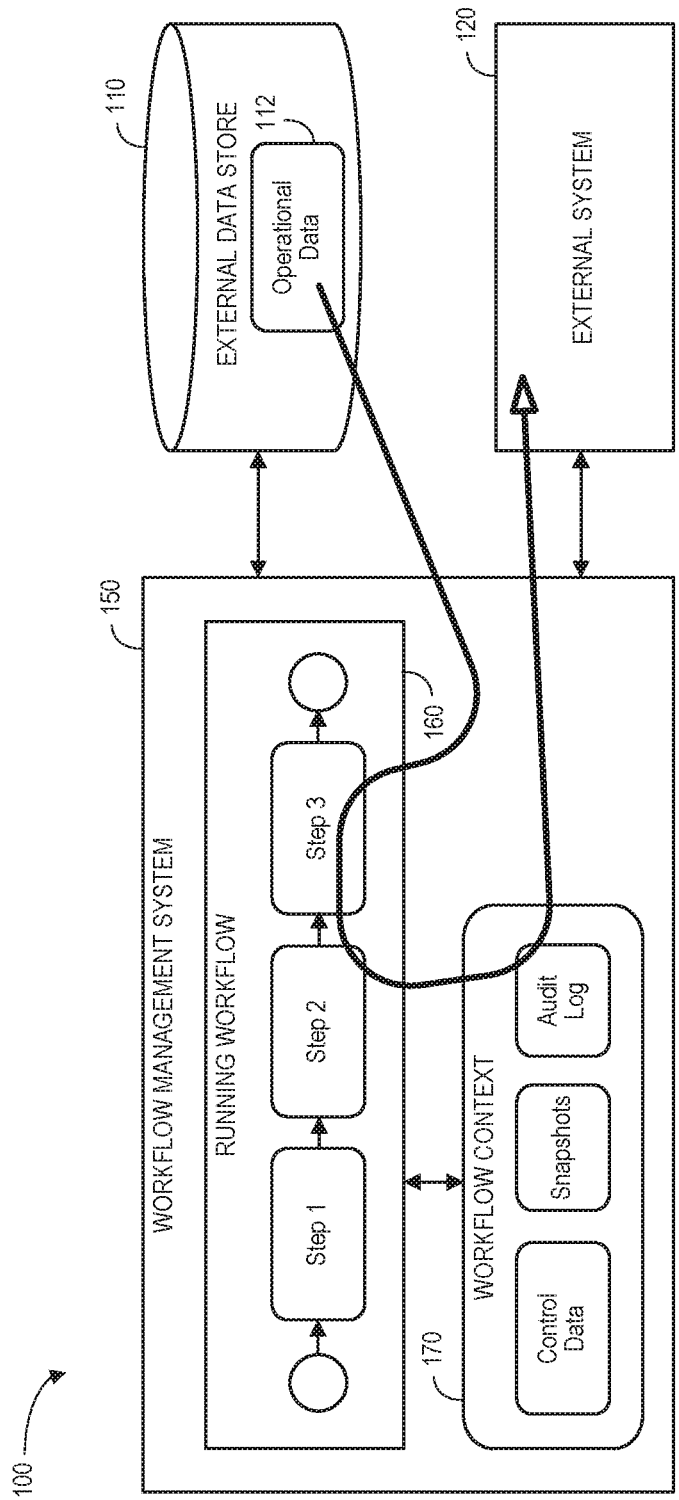
FIG. 1 is one example of a workflow environment.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A workflow management system environment may serve as the sole foundation of entire applications. Such applications may be referred to herein as "workflow-based applications." A key challenge when building any type of application is selecting the right persistence technology to store an application state information and business data. Some embodiments described herein may keep application state information in a workflow context while keeping business data outside of the workflow context.

Often, workflow-based applications may store all of an application's state information and business data inside of the workflow's context that drives it. As used herein, the term "workflow context" may refer to a container for data attached to each workflow (workflow instance, that is) that the latter has access to throughout its lifetime. It is typically based on a generic persistence embodied into a workflow management system. Being generic, the workflow context is structurally able to hold any kind of data but hence also has the drawback that it is not optimized for any particular kind of data. As the execution of a workflow is audited to accommodate for legal compliance reasons (e.g., Sarbanes-Oxley regulations), it is not uncommon for the workflow context to be versioned and subject to snapshotting as the execution of the workflow progresses. As a consequence, data stored in the workflow context may be comparably expensive. As with any type of persistence, the workflow context is not a one-size-fits-all solution. It serves the primary purpose to steer the execution of the workflow and should contain only the information that is absolutely necessary for it to operate properly. Conversely, business data (or "operational data" in broader terms) should reside outside of the workflow's context.

For example, FIG. 1 is one example of a workflow environment 100 that stores operational data 112 in an external data store 110 fully outside of a workflow context 170 (e.g., control data, snapshots, audit logs, etc.) of a workflow management system 150 executing a running workflow 160 (e.g., steps 1 through 3 as illustrated in FIG. 1). The context 170 should typically only contain references to the business data at hand (business object identifiers, etc.). Note that by following this practice, the amount of data stored in the workflow context 170 may be substantially smaller than the operational data 112 (e.g., up to orders of magnitude smaller).

If the difference between the application state information kept in the workflow context 170 and the operational data 112 stored in the external data store 110 was always clear and overlap-free, the problem might be addressed by being deliberate about which data to store where. Unfortunately, practice shows this is not always the case and boundaries between the two may sometimes become blurred. Specifically, when interacting with external systems 120 (e.g. when calling remote endpoints via service tasks), it is often exactly the operational data 112 that needs to be provided along with the call itself. In these cases, the operational data 112 becomes relevant for the execution of the workflow 160 and needs to be brought into the workflow's context 170, smearing with the application's state information that is stored in the workflow context 170 and lowering a workflow management environment's performance and ability to scale as the load increases.

Figure 2:
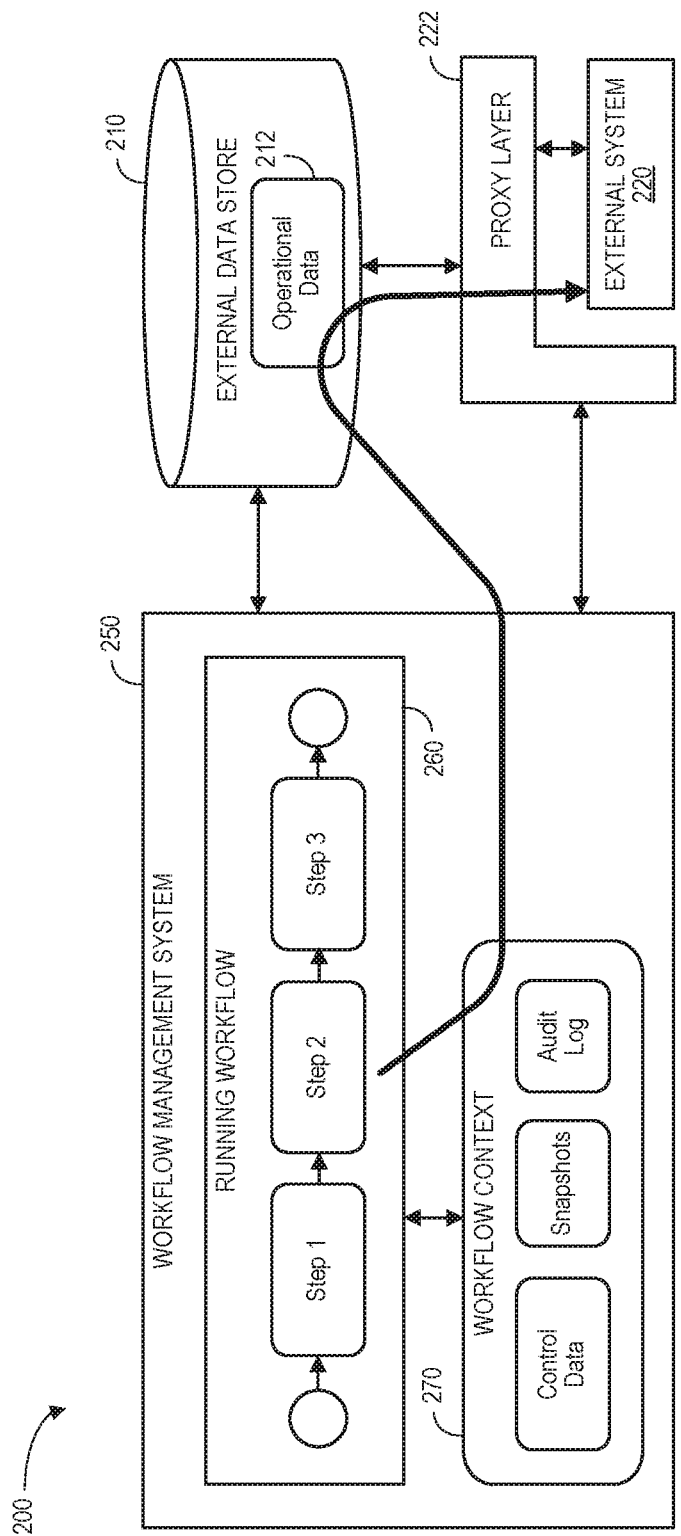
FIG. 2 shows another example of a workflow environment.

In these situations, in order to avoid copying this operational data into the workflow context, such a call to an external system needs to be externalized into and proxied by a layer beyond the workflow management system (herein referred to a service proxy layer). For example, FIG. 2 is an example of a workflow environment 200 that stores operational data 212 in an external data store 210 fully outside of a workflow context 270 (e.g., control data, snapshots, audit logs, etc.) of a workflow management system 250 executing a running workflow 260 (e.g., steps 1 through 3 as illustrated in FIG. 2). A proxy layer 222 may exit between an external system 220 and the workflow management system 250 and external data store 210 (e.g., where the operational data 212 resides). This approach may lower developer productivity and make access to the operational data 212 feel alien to the workflow management system 250 at hand. Today, a workflow developer needs to build this proxy layer 222 on his or her own and interface with it by via service tasks. This can impose a lot of additional burden onto the developer.

Figure 3:
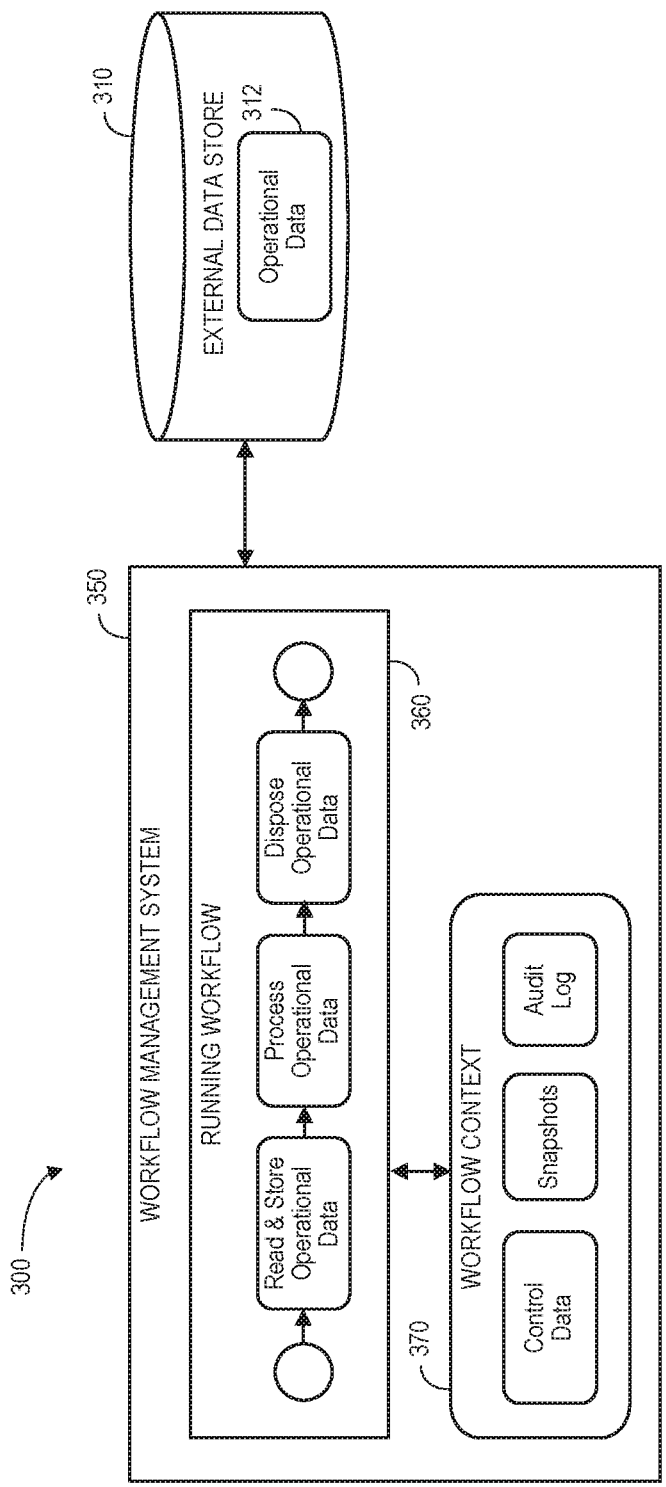
FIG. 3 is an example of a workflow environment in accordance with some embodiments.

To avoid this, some embodiments of the present invention access business and/or operational data (or any data for that matter) stored externally to a workflow's context integrated into a workflow management system in such a way that access to it is as seamless as if it were stored in the context itself (but without the performance drawbacks). For example, FIG. 3 is an example of a workflow environment 300 that stores operational data 312 in an external data store 310 fully outside of a workflow context 370 (e.g., control data, snapshots, audit logs, etc.) of a workflow management system 350 executing a running workflow 360. The running workflow 360 might comprise, for example, a step that reads and stores the operational data 312, followed by a step that processes the operational data 312, followed by a step that disposes of the operational data 312, etc. Note that this integration may facilitate extensibility by various types of persistence technologies, ranging from key/value stores to object stores, relational databases, etc.

Such an approach may give a developer a perception of being able to access remote data residing on the external data store 310 in almost the exact same way as if the data already resided in the workflow context 370 and without having to persist those data in the workflow context 370 at any stage during its processing. Note that traditional access to the operational data 312 would require calling into the external data store 310 via its remote APIs using a service task that fetches some data, to store it in the workflow's context 370 and to then access it from there (from where it is then explicitly deleted once no longer needed). This is reminiscent of procedural programming and doable but cumbersome, let alone highly inefficient as the data is persisted in the workflow context 370 (at least temporarily).

Some embodiments described herein instead lift access to the external data store 310 to a declarative level where the repetitive steps of reading external data and writing changes back are standardized and hidden from the developer. The core of a workflow management system where declarative concepts can be facilitated may be a Data Access Language ("DAL"), through which a developer can access and manipulate a workflow context 370 (either when evaluating expressions or when executing scripts in the context of the running workflow 360).

When accessing remote data in a declarative way, data will, without loss of generality, in three steps:
(1) be copied over transparently for the developer,
(2) be held transiently while the data is processed (e.g., in a short-lived session) up to the point where,
(3) it is released again.

Changes made during this session may be automatically played back to the external data store 310 without the developer's involvement. Note that such a process might be performed automatically or be initiated via a command from a remote operator interface device. As used herein, the term "automatically" may refer to, for example, actions that can be performed with little or no human intervention.

As used herein, devices, including those associated with the environment 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The workflow management system 350 and any other device described herein, may store information into and/or retrieve information from various data stores (e.g., the external data store 310), which may include storage that is locally stored or reside remote from the system 350.

Although a single workflow management system 350 is shown in FIG. 3, any number of such devices may be included in the environment 300. Moreover, various devices described herein might be combined according to embodiments of the present invention. Some or all of the environment 300 functions might be performed by a constellation of networked apparatuses, such as in a distributed processing or cloud-based architecture.

An operator or administrator may access the workflow management system 350 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to define workflow steps) and/or provide or receive automatically generated recommendations or results from the environment 300.

Figure 4:
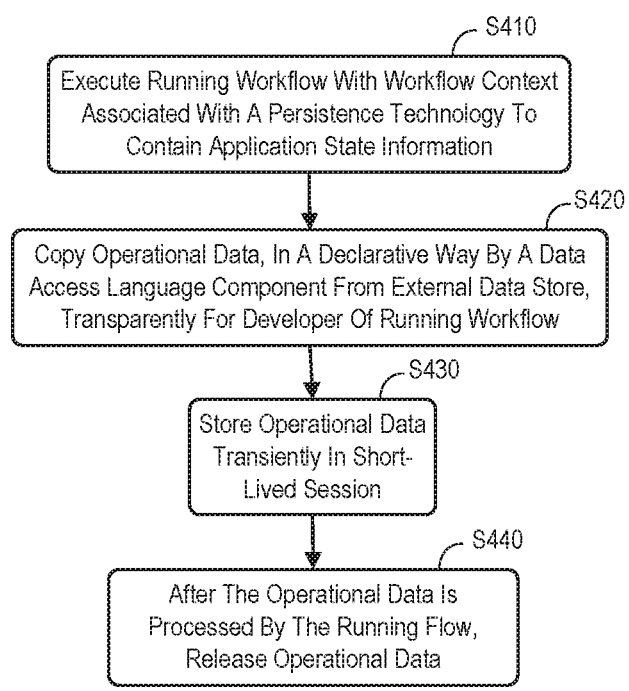
FIG. 4 is a workflow method according to some embodiments.

FIG. 4 is a workflow method that might performed by some or all of the elements of the environment 300 described with respect to FIG. 3. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a workflow management system may execute a running workflow with a workflow context associated with a persistence technology to contain application state information. At S420, the system may copy operational data, in a declarative way by a data access language component coupled between the running workflow and an external data store associated with a persistence technology to contain the operational data, transparently for a developer of the running workflow. At S430, the system may store the operational data transiently in a short-lived session and, after the operational data is processed by the running flow, release the operational data at S4450.

Figure 5:
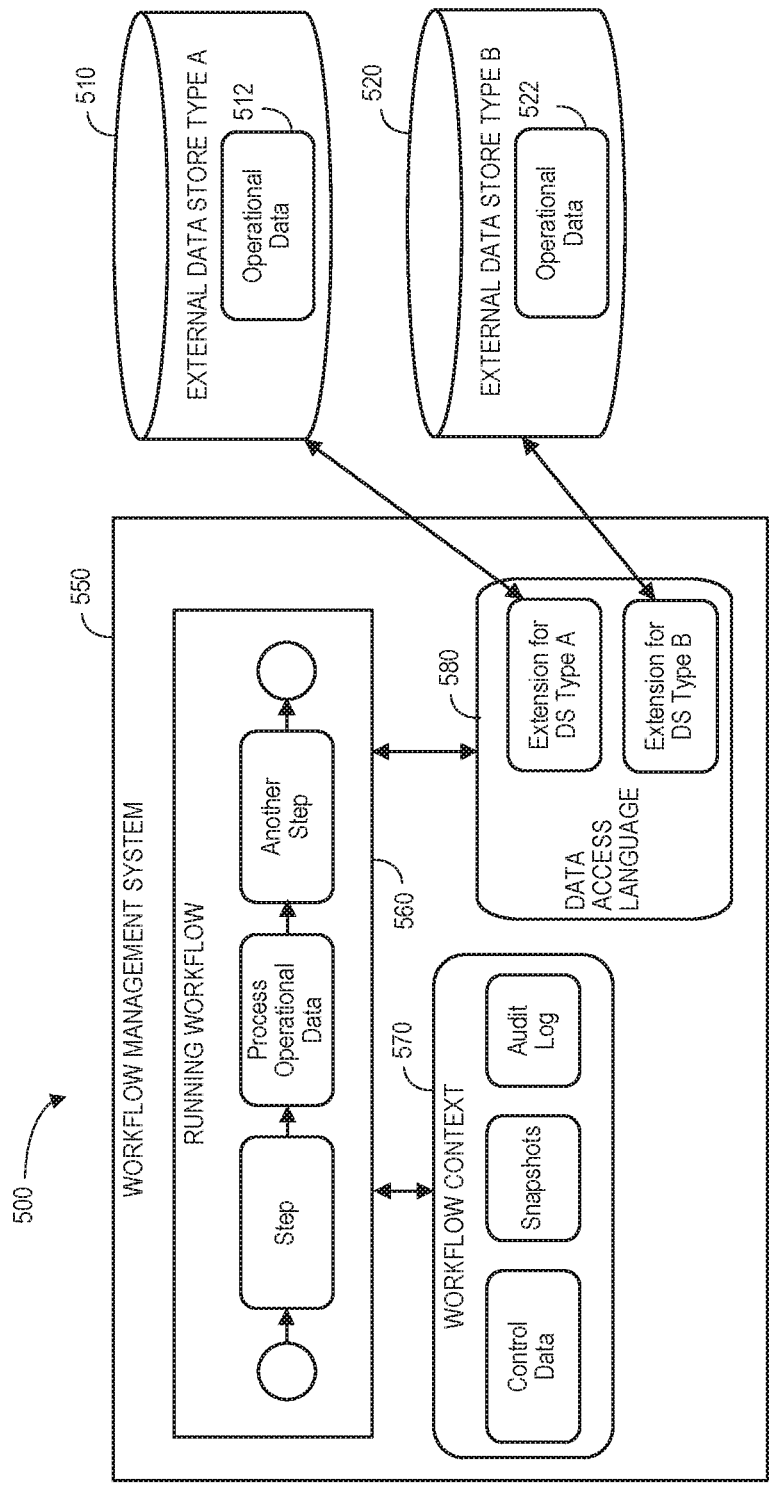
FIG. 5 is a more detailed view of a workflow environment in accordance with some embodiments.

FIG. 5 is an example of a workflow environment 500 that stores type A operational data 512 in a type A external data store 510 fully outside of a workflow context 570 (e.g., control data, snapshots, audit logs, etc.) of a workflow management system 550 executing a running workflow 560. Similarly, the environment 500 may store type B operational data 522 in a type B external data store 520. The running workflow 550 might comprise, for example, an initial step, followed by a step that processes the operational data 512, followed by another step, etc. A DAL 580 may act as an interface between the running workflow 560 and the external data stores 510, 520. In particular, the DAL 580 may include an extension for the type A external data store 510 (where the type A operational data 512 is stored) and an extension for the type B external data store 520 (where the type B operational data 522 is stored). Note that enabling remote data access via the workflow management system 350 DAL 380 may require making the DAL 580 "extensible." As used herein, the term "extensibility" may refer to, for example, enhancing the DAL 580 with constructs that orchestrate the above steps implicitly as the remote data 512, 522 is referenced and processed. These constructs can either be syntactical additions to the core language or come in form of APIs provided along with the language runtime. In either case, they may be backed by and bound to runtime libraries that provide for the actual implementation of the above three steps. According to some embodiments, generic extensions may cater to an entire class of external data stores such as Structured Query Language ("SQL") for relational databases or may be data store-specific extensions (e.g., one extension supporting the MongoDB query language for MongoDB, another supporting the Cassandra Query Language for Apache Cassandra, still another for DynamoDB, etc.). In this way, extensible persistence hierarchies for a workflow management system may be provided.

In this way, some embodiments may provide a hassle-free, seamless developer experience without needing hand-crafted service proxy layers. Moreover, embodiments may provide freedom for the developer to store the data in a performance-optimized fashion in a store as he or she sees fit. In addition, embodiments may reduce an amount of redundant data that is stored at several locations (if the data can be accessed directly at the system of record).

According to some embodiments, Business Process Model and Notation ("BPMN") may be used to formally denote workflow definitions. Similarly, a JavaScript and/or a Java Unified Expression Language ("JUEL")-based notation using an API-based extension approach may express access to external data stores in a workflow. Note, however, that and of the embodiments described herein may instead use workflows formalized in other notations and/or data accessed in other languages.

Figure 6:
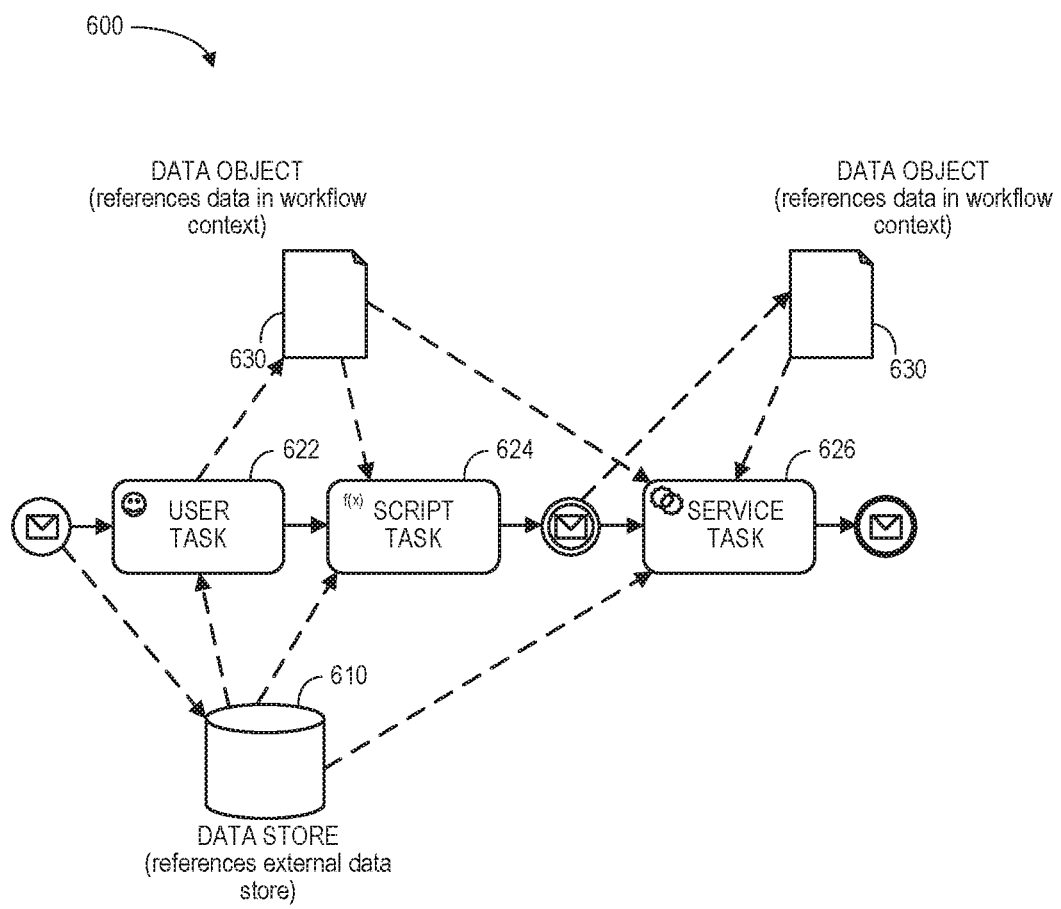
FIG. 6 is a formal workflow definition according to some embodiments.

Consider points of data access in a workflow in an exemplary, more formal workflow definition (e.g., to see at what places internal and external data is referenced and how). For example, FIG. 6 is a formal workflow definition 600 according to some embodiments. An external data store 610 may be accessed (e.g., by a user task 622, script task 624, service task, etc.) in connection with data objects 630 (that reference data in a workflow context). The notation uses BPMN data objects 630 ("sheets of paper" symbols in FIG. 6) to represent data in the workflow context and BPMN data stores 610 ("data base" symbols in FIG. 6) to represent data in external data stores. It is assumed that properties attached to the data store define which external data store is referenced and how.

The workflow definition 600 includes a start event that is started through an inbound message the payload of which is also stored in the external data store by virtue of the (BPMN) data store 610 to which a write arrow (a dashed arrow in FIG. 6) points (note the dashed lines are typically illustrative in BPMN only and are often hidden as they can quickly overload a visualization). Data in the data store 610 is then fed into the user task 622 where the data is then presented to the user. The user might modify the data or take a decision (e.g. an approval). The results of the user interaction are then written into a data object 630 which points to a place in the workflow context (each data story typically identifies a variable). After that, the script task 624 is invoked that reads data from both the data object 630 and the data store 610, does some computation of some sort, and then writes the results back to the data store 610. After that, the workflow 600 waits for a message to arrive. Once present, the message's payload is written to a second data object 630. Finally, data out of both data objects 630 along with data from the data store 610 is combined into the call to an external system happening via the service task 626. This workflow 600 shows how access to external data can be made seamless and nicely mixed with data from the workflow context without feeling much different from one another.

Taking the illustration of FIG. 6 as a reference and generalizing it further, data can be written to and read from the workflow context at the following places (this list is based on BPMN concepts and non-exhaustive). A "Declaration" data access type may be placed at a workflow data store. Note that a data store can be used to declare the use of a specific external data store within a workflow, possibly specifying a specific data collection by providing a selection query (or doing filtering of some sort).

A "Write" data access type may be placed at a workflow start event. In this case, data may be received along with the start of a workflow and can be written directly to an external data store. A "Write" data access type may also be placed at a workflow intermediate event with a message catch and/or at a workflow receive task (which, in either case may be treated the same as the start event).

A "Read" data access type may be placed at a workflow end event. In this case, an end event can send data from an external data store along with the event's payload. A "Read" data access type may also be placed at a workflow intermediate event with a message throw and/or a workflow send task (which, in either case may be treated the same as the end event).

A "Read and Write" data access type may be placed at a workflow service task. In this case, a service task can directly take data from an external data store and send it to the remote system and/or write results of the invocation back to the data store. A "Read and Write" data access type may instead be placed at a workflow script task and a script task can process data from the external data store, mingle it with data from the workflow's context, and write data back (if needed). In some cases, a "Read and Write" data access type may be placed at a workflow user task (which can be handled the same as a service task).

Figure 7:
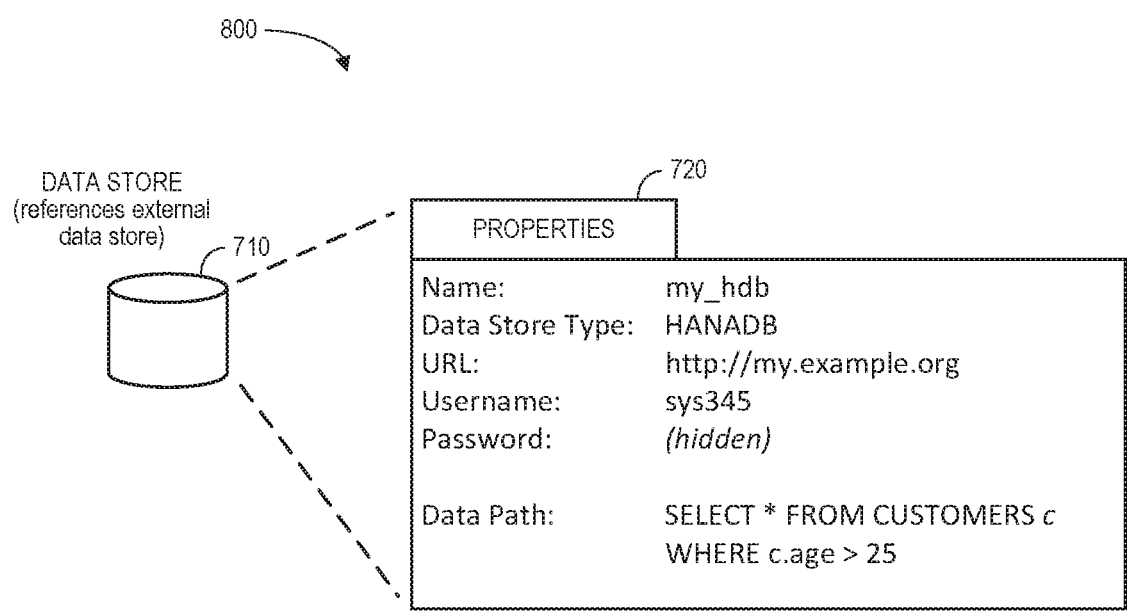
FIG. 7 shows a data store configuration in accordance with some embodiments.

Some examples will now be described to concretize the semantics of and detail out data access language enhancements and how they are used. With respect to the pluggability of external data stores into a workflow context, FIG. 7 shows a data store configuration 700 in accordance with some embodiments. The configuration 700 shows how a data store 710 can be configured via properties 720 to point to an external data store and provide not only the technical coordinates to the system but also define the criteria for which data should be loaded.

With respect to reading data from and writing data to a workflow context, assume that the data store 610 has been defined. Access to information in the data store 610 might be implemented using the following JavaScript syntax:

```
$.stores.my_hdb.forEach(c => {
    $.context.user_names.push(c.firstName + " " + c.lastName)
})
```

This snippet shows the system transiently accessing customer records out of the external data store (a HANA database in this case), iterating over all customers (who are older than 25 years), extracting their first and last names, and, finally, storing them in the workflow context in a "user_names" variable (which would be represented as a corresponding data object on the canvas).

Moreover, when starting a workflow, the payload may be passed along with the call can store data directly in the external data store:

```
{
    workflowDefinitionId: "ApproveNewCustomer",
    context: { "user_names": [ ] },
    stores: {
        my_hdb: [ { firstName: "Peter", lastName: "Smith", age: 30 } ]
    }
}
```

Figure 8:
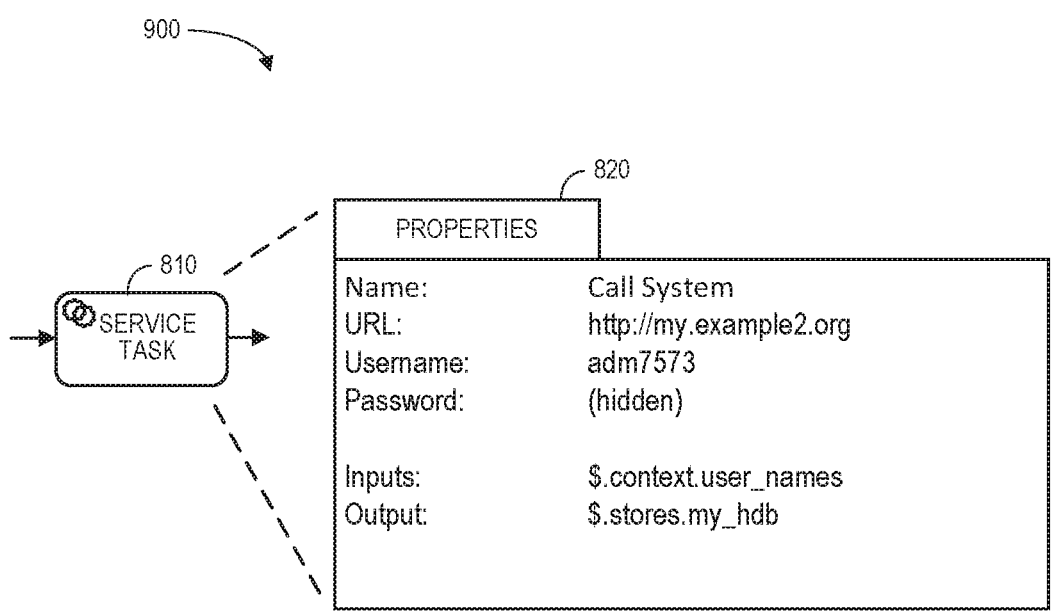
FIG. 8 shows a service call according to some embodiments.
Figure 9:
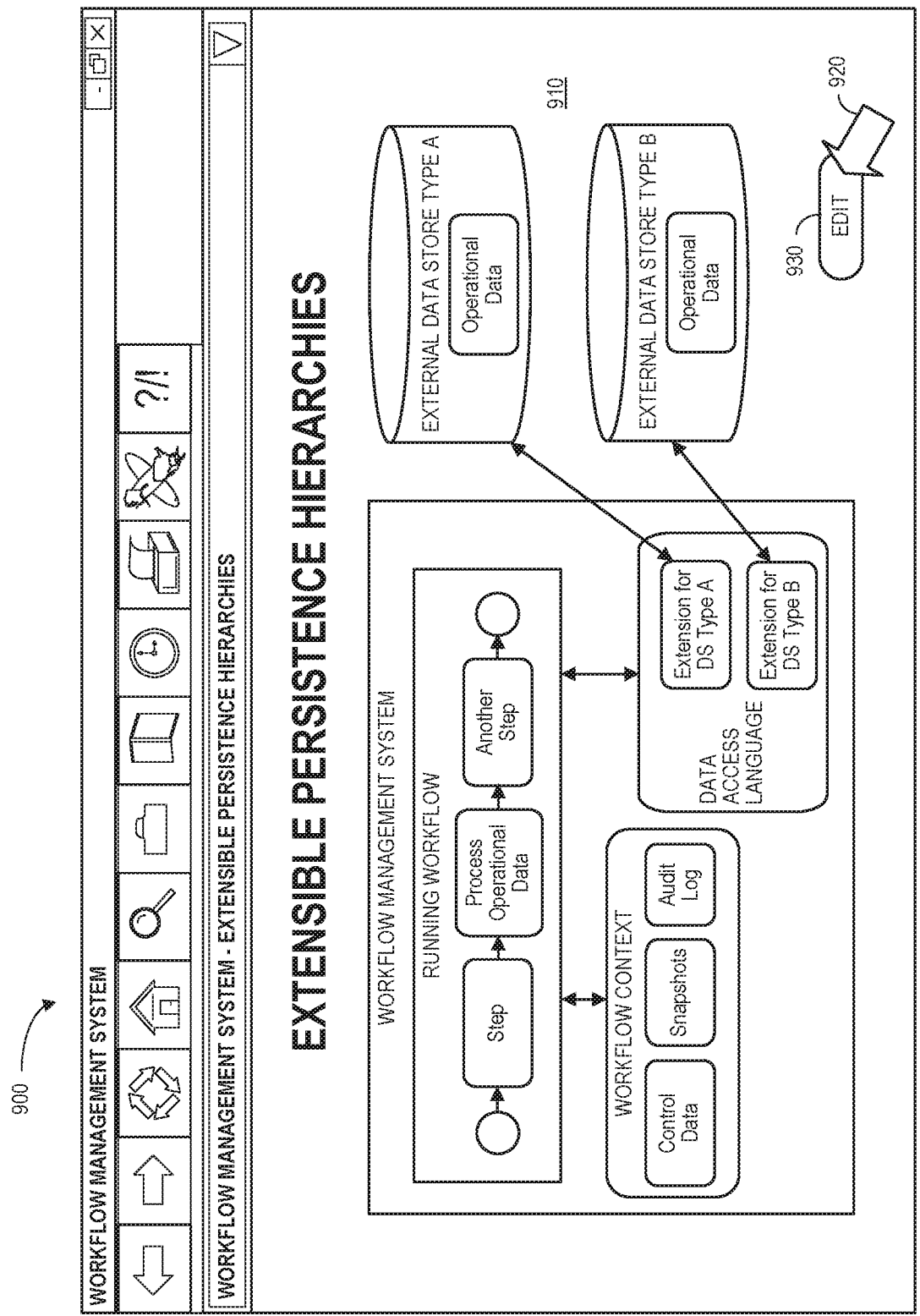
FIG. 9 is a human machine interface display according to some embodiments.

This payload would, for example, start a new workflow instance with definition ID "ApproveNewCustomer" and initialize the workflow context to have an empty "user_names" variable. It would also store a new user record in the HANA database. FIG. 8 shows a service call 800 according to some embodiments. As shown in FIG. 8, when calling a service (e.g., in connection with a service task 810), request and response variables in properties 820 may also reference data objects and data stores.

Figure 10:
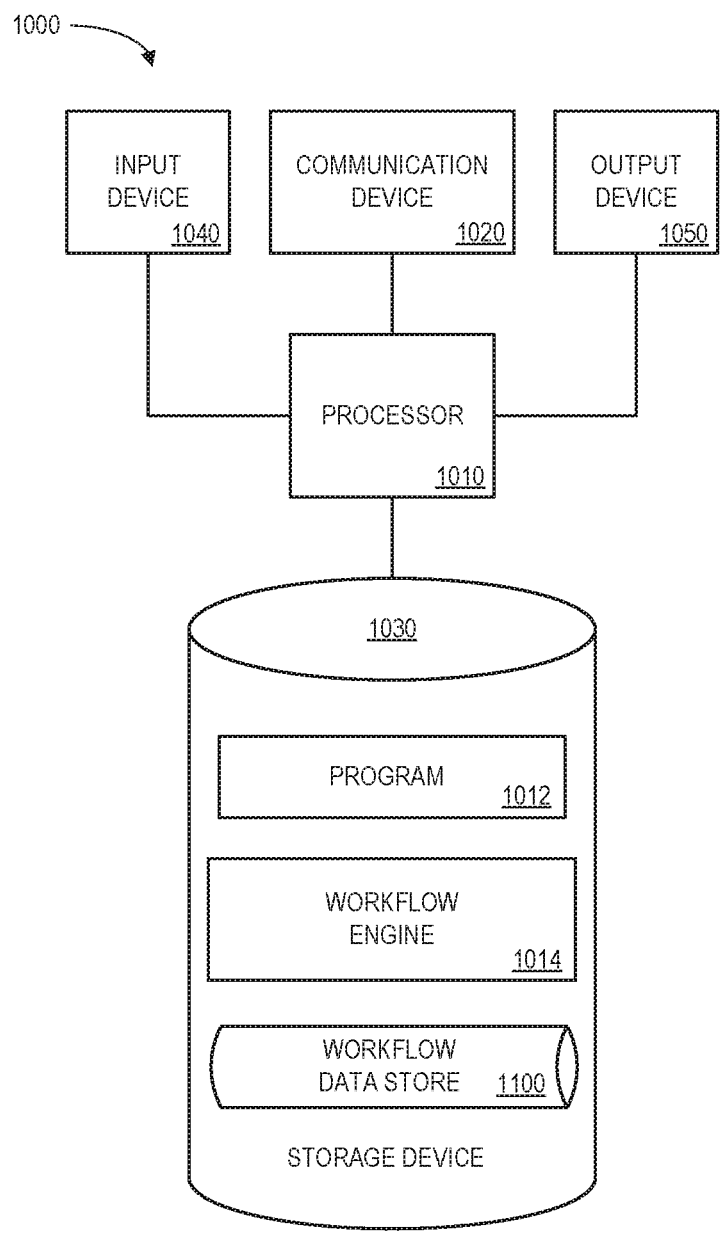
FIG. 10 is an apparatus or platform according to some embodiments.

FIG. 10 is a human machine interface display 1000 in accordance with some embodiments. The display 1000 includes a graphical representation 1010 of a workflow environment in accordance with any of the embodiments described herein. Selection of an element on the display 1000 (e.g., via a touchscreen or a computer pointer 1020) may result in display of a popup window containing more detailed information about that element and/or various options (e.g., to display data access language details, etc.). Selection of an "Edit" icon 1030 may also let an operator or administrator adjust extensible persistence hierarchies.

Note that the embodiments described herein may be implemented using any number of different hardware configurations. For example, FIG. 10 is a block diagram of an apparatus or platform 1000 that may be, for example, associated with the system 500 of FIG. 5 (and/or any other system described herein). The platform 1000 comprises a processor 1010, such as one or more commercially available Central Processing Units ("CPUs") in the form of one-chip microprocessors, coupled to a communication device 1020 configured to communicate via a communication network (not shown in FIG. 10). The communication device 1020 may be used to communicate, for example, with one or more remote designer platforms, administrator platforms, etc. The platform 1000 further includes an input device 1040 (e.g., a computer mouse and/or keyboard to input information about external data stores) and/an output device 1050 (e.g., a computer monitor to render a display, transmit optimization recommendations, and/or create reports about extensible persistence hierarchies, etc.). According to some embodiments, a mobile device, monitoring physical system, and/or PC may be used to exchange information with the platform 1000.

The processor 1010 also communicates with a storage device 1030. The storage device 1030 may comprise any appropriate information storage device, including combinations of magnetic storage devices (e.g., a hard disk drive), optical storage devices, mobile telephones, and/or semiconductor memory devices. The storage device 1030 stores a program 1012 and/or a workflow engine 1014 for controlling the processor 1010. The processor 1010 performs instructions of the programs 1012, 1014, and thereby operates in accordance with any of the embodiments described herein. For example, the processor 1010 might access external data store may be associated with a persistence technology to contain operational data. The processor 1010 may include a running workflow and a workflow context associated with a persistence technology to contain application state information (e.g., control data, snapshots, audit logs, etc.). A data access language component of the processor 1010 may be coupled between the running workflow and the external data store to access the operational data in a declarative way. The processor 1010 may, for example, copy the operational data transparently for a developer of the running workflow. The processor 1010 may then store the operational data transiently in a short-lived session and, after the operational data is processed by the running flow, release the operational data. According to some embodiments, changes made to the to the operational data are automatically played by the processor 1010 back to the external data store.

The programs 1012, 1014 may be stored in a compressed, uncompiled and/or encrypted format. The programs 1012, 1014 may furthermore include other program elements, such as an operating system, clipboard application, a database management system, and/or device drivers used by the processor 1010 to interface with peripheral devices.

As used herein, information may be "received" by or "transmitted" to, for example: (i) the platform 1000 from another device; or (ii) a software application or module within the platform 1000 from another software application, module, or any other source.

In some embodiments (such as the one shown in FIG. 10), the storage device 1030 further stores a workflow data store 1100. An example of a database that may be used in connection with the platform 1000 will now be described in detail with respect to FIG. 11. Note that the database described herein is only one example, and additional and/or different information may be stored therein. Moreover, various databases might be split or combined in accordance with any of the embodiments described herein.

Figure 11:
FIG. 11 is portion of a workflow data store in accordance with some embodiments.

Referring to FIG. 11, a table is shown that represents the workflow data store 1100 that may be stored at the platform 1000 according to some embodiments. The table may include, for example, entries associated with an application implemented via a cloud computing environment. The table may also define fields 1102, 1104, 1106, 1108, 1110 for each of the entries. The fields 1102, 1104, 1106, 1108, 1110 may, according to some embodiments, specify: a workflow identifier 1102, a developer identifier 1104, a date and time 1106, external data store identifiers 1108, and data type 1110. The workflow data store 1100 might be created and updated, for example, when a new workflow is created by a developer, a workflow is modified, etc.

The workflow identifier 1102 might be a unique alphanumeric label that is associated with a workflow to be executed by a workflow management system by a developer associated with the developer identifier 1104. The date and time 1106 might indicate, for example, when the workflow was created, when the workflow was last modified, when the workflow as last executed, etc. The external data store identifiers 1108 and data types 1110 might define the operational data (e.g., business data) that will be accessed in external systems.

Thus, embodiments may represent a refinement of BPMN data stores to a concrete, technical implementation concept of how external data can be brought into a workflow using declarative concepts. Note that in K2 process automation, a "smart object" may exhibit an interface with methods that can then be called through a service task in the workflow. That is a more procedural concept (and not declarative in nature) and doesn't integrate into the data access language as do embodiments described herein.

Figure 12:
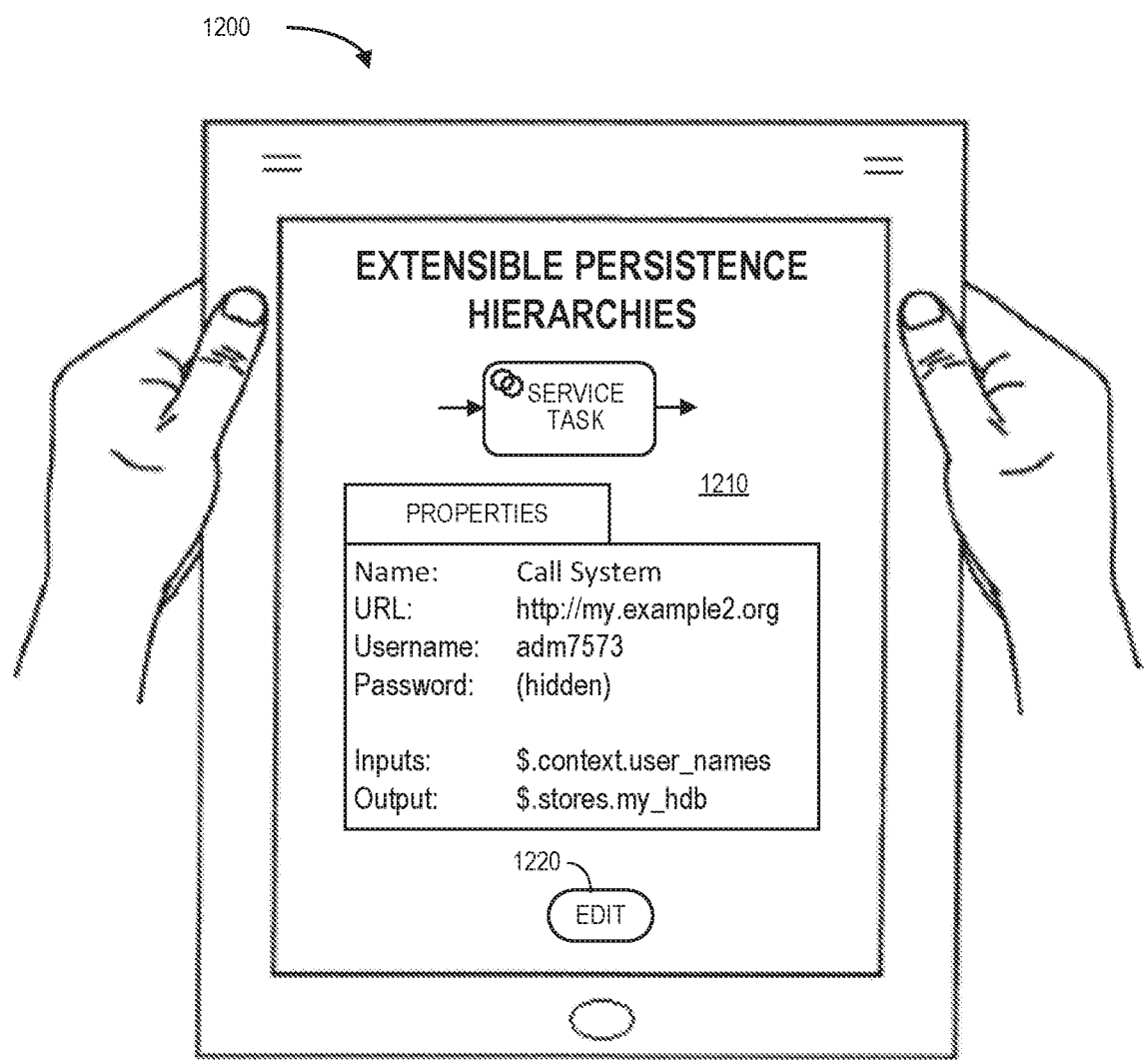
FIG. 12 is a tablet computer providing an extensible persistence hierarchies display according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of application integrations and microservices, any of the embodiments described herein could be applied to other types of applications. Moreover, the displays shown herein are provided only as examples, and any other type of user interface could be implemented. For example, FIG. 12 illustrates a tablet computer 1200 with an extensible persistence hierarchies display 1210. The display 1210 might be used, for example, by an operator or administration to configure a workflow management system (e.g., to map external data stores, configure local workflow context storage, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A workflow management environment, comprising:
 a type A external data store associated with a persistence technology to contain type A operational data;
 a type B external data store associated with a persistence technology to contain type B operational data;
 a workflow management platform, including:
  a running workflow,
  a workflow context associated with a persistence technology to contain application state information, and
  a data access language component, coupled between the running workflow, the type A external data store, and the type B external data store, to access the type A and type B operational data in a declarative way, including:
   a computer processor, and
   computer memory, coupled to the computer processor, storing instructions that, when executed by the computer processor, cause the data access language component to:
    (i) copy the type A and type B operational data transparently for a developer of the running workflow,
    (ii) store the type A and type B operational data transiently in a short-lived session, and
    (iii) after the type A and type B operational data is processed by the running flow, release the type A and type B operational data,
  wherein the data access language component includes extensions associated with constructs to handle both type A and type B operational data.

2. The environment of claim 1, wherein at least one of the type A and type B operational data comprises business data.

3. The environment of claim 1, wherein the workflow context is associated with at least one of: (i) control data, (ii) snapshots, and (iii) audit logs.

4. The environment of claim 1, wherein the constructs are associated with syntactical additions to a core language.

5. The environment of claim 1, wherein the constructs are associated with Application Programming Interfaces ("APIs") that are provided along with a language runtime.

6. The environment of claim 1, wherein the constructs are backed by and bound to runtime libraries.

7. The environment of claim 1, wherein generic extensions cater to an entire class of external data stores.

8. The environment of claim 7, wherein the entire class of external data stores are associated with the Structured Query Language ("SQL") for relational databases.

9. The environment of claim 1, wherein the extensions comprise data store-specific extensions.

10. The environment of claim 1, wherein changes made to the to the type A and type B operational data are automatically played back to the type A external data store and the type B external data store, respectively.

11. The environment of claim 1, wherein a workflow is associated with a Business Process Model and Notation ("BPMN") workflow definition and at least one of: (i) declaration data access type at a data store in the workflow, (ii) write data access type at a start event in the workflow, (iii) write data access type at an intermediate event w/ message catch in the workflow, (iv) write data access type at a receive task in the workflow, (v) read data access type at an end event in the workflow, (vi) read data access type at an intermediate event w/ message throw in the workflow, (vii) read data access type at a send task in the workflow, (viii) read and write data access type at a service task in the workflow, (ix) read and write data access type at a script task in the workflow, and (x) read and write data access type at a user task in the workflow.

12. A computer-implemented method associated with a workflow management environment, comprising:
executing, by a workflow management system, a running workflow with a workflow context associated with a persistence technology to contain application state information;
copying operational data, in a declarative way by a data access language component coupled between the running workflow and an external data store associated with a persistence technology to contain the operational data, transparently for a developer of the running workflow;
storing the operational data transiently in a short-lived session; and
after the operational data is processed by the running flow, releasing the operational data,
wherein a workflow is associated with a Business Process Model and Notation ("BPMN") workflow definition and at least one of: (i) declaration data access type at a data store in the workflow, (ii) write data access type at a start event in the workflow, (iii) write data access type at an intermediate event w/ message catch in the workflow, (iv) write data access type at a receive task in the workflow, (v) read data access type at an end event in the workflow, (vi) read data access type at an intermediate event w/ message throw in the workflow, (vii) read data access type at a send task in the workflow, (viii) read and write data access type at a service task in the workflow, (ix) read and write data access type at a script task in the workflow, and (x) read and write data access type at a user task in the workflow.

13. The method of claim 12, wherein the constructs are associated with syntactical additions to a core language.

14. The method of claim 12, wherein the constructs are associated with Application Programming Interfaces ("APIs") that are provided along with a language runtime.

15. The method of claim 12, wherein the constructs are backed by and bound to runtime libraries.

16. The method of claim 12, wherein generic extensions cater to an entire class of external data stores.

17. A non-transitory, computer-readable medium storing instructions, that, when executed by a processor, cause the processor to perform a method associated with a workflow management environment, the method comprising:
executing, by a workflow management system, a running workflow with a workflow context associated with a persistence technology to contain application state information;
copying type A and type B operational data, in a declarative way by a data access language component coupled between the running workflow, a type A external data store associated with a persistence technology to contain the type A operational data, and a type B external data store associated with a persistence technology to contain the type B operational data, transparently for a developer of the running workflow;
storing the type A and type B operational data transiently in a short-lived session; and
after the type A and type B operational data is processed by the running flow, releasing the type A and type B operational data.

18. The medium of claim 17, wherein the type A and type B operational data comprises business data.

19. The medium of claim 17, wherein the workflow context is associated with at least one of: (i) control data, (ii) snapshots, and (iii) audit logs.

20. The medium of claim 17, wherein changes made to the to the type A and type B operational data are automatically played back to the type A external data store and the type B external data store, respectively.

* * * * *